United States Patent
Okazaki (10) Patent No.: US 10,072,543 B2
(45) Date of Patent: *Sep. 11, 2018

(54) CERAMIC HONEYCOMB STRUCTURE AND ITS PRODUCTION METHOD

(71) Applicant: HITACHI METALS, LTD., Tokyo (JP)

(72) Inventor: Shunji Okazaki, Fukuoka (JP)

(73) Assignee: HITACHI METALS, LTD., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 15/517,026

(22) PCT Filed: Mar. 17, 2016

(86) PCT No.: PCT/JP2016/058467
§ 371 (c)(1),
(2) Date: Apr. 5, 2017

(87) PCT Pub. No.: WO2016/152709
PCT Pub. Date: Sep. 29, 2016

(65) Prior Publication Data
US 2017/0298794 A1    Oct. 19, 2017

(30) Foreign Application Priority Data
Mar. 24, 2015    (JP) .................. 2015-061265

(51) Int. Cl.
*B01D 50/00* (2006.01)
*B01D 39/20* (2006.01)
(Continued)

(52) U.S. Cl.
CPC ....... *F01N 3/0222* (2013.01); *B01D 46/2429* (2013.01); *B28B 3/269* (2013.01);
(Continued)

(58) Field of Classification Search
CPC ........ B01D 46/2429; B01D 2046/2433; B01D 2046/2496; B01D 2046/2437
See application file for complete search history.

(56) References Cited

U.S. PATENT DOCUMENTS 8,500,840 B2 *    8/2013    Okazaki .............. B01D 46/2429
422/169
9,649,587 B2 *    5/2017    Okazaki .............. B01D 46/2429
(Continued)

FOREIGN PATENT DOCUMENTS

JP    61-129015 A    6/1986
JP    2002-219319 A    8/2002
(Continued)

OTHER PUBLICATIONS

International Search Report for PCT/JP2016/058467 dated May 24, 2016 [PCT/ISA/210].

*Primary Examiner* — Amber Rose Orlando
(74) *Attorney, Agent, or Firm* — Sughrue Mion, PLLC (57) ABSTRACT

A ceramic honeycomb structure having pluralities of flow paths partitioned by porous cell walls; (a) the cell walls having porosity of 50-60%; and (b) in a pore diameter distribution in the cell walls measured by mercury porosimetry, (i) pore diameters at cumulative pore volumes corresponding to particular percentages of the total pore volume being within specific ranges and having specific relationships; and (ii) the difference between a logarithm of the pore diameter at a cumulative pore volume corresponding to 20% of the total pore volume and a logarithm of the pore diameter at 80% being 0.39 or less, and its production method.

5 Claims, 2 Drawing Sheets

(51) Int. Cl.
*B01D 39/06* (2006.01)
*B01D 39/14* (2006.01)
*F01N 3/022* (2006.01)
*B28B 3/26* (2006.01)
*B01D 46/24* (2006.01)
*C04B 38/00* (2006.01)
*C04B 38/06* (2006.01)
*C04B 35/20* (2006.01)

(52) U.S. Cl.
CPC .......... *C04B 35/20* (2013.01); *C04B 38/0006* (2013.01); *C04B 38/0054* (2013.01); *C04B 38/06* (2013.01); *B01D 2046/2433* (2013.01); *B01D 2046/2437* (2013.01); *B01D 2046/2481* (2013.01); *B01D 2275/30* (2013.01); *B01D 2279/30* (2013.01); *C04B 2235/3218* (2013.01); *C04B 2235/349* (2013.01); *C04B 2235/3418* (2013.01); *C04B 2235/3445* (2013.01); *C04B 2235/6021* (2013.01); *F01N 2330/06* (2013.01)

(56) References Cited

U.S. PATENT DOCUMENTS

2003/0093982 A1* 5/2003 Suwabe .............. B01D 46/2459
                                                          55/523
2011/0135873 A1* 6/2011 Okazaki ................ C04B 35/195
                                                          428/116
2012/0317947 A1* 12/2012 Okazaki .............. C04B 38/0006
                                                          55/523

FOREIGN PATENT DOCUMENTS

| JP | 2003-040687 A | 2/2003 |
| JP | 2004-360654 A | 12/2004 |
| JP | 2005-530616 A | 10/2005 |
| JP | 2009-517327 A | 4/2009 |
| JP | 2011-516371 A | 5/2011 |
| WO | 2007/108428 A1 | 9/2007 |
| WO | 2011/027837 A1 | 3/2011 |
| WO | 2011/102487 A1 | 8/2011 |
| WO | 2014/163036 A1 | 10/2014 |

* cited by examiner

CERAMIC HONEYCOMB STRUCTURE AND ITS PRODUCTION METHOD

CROSS REFERENCE TO RELATED APPLICATIONS

This application is a National Stage of International Application No. PCT/JP2016/058467, filed on Mar. 17, 2016 (which claims priority from Japanese Patent Application No. 2015-061265, filed on Mar. 24, 2015), the contents of which are incorporated herein by reference in their entirety.

FIELD OF THE INVENTION

The present invention relates to a ceramic honeycomb filter for removing particulate matter from exhaust gases of diesel engines, particularly to a ceramic honeycomb structure used for a ceramic honeycomb filter for removing particulate matter having diameters of 50 nm or less (so-called nano-particles).

BACKGROUND OF THE INVENTION

Exhaust gases discharged from diesel engines contain particulate matter (PM) comprising as main components carbonaceous soot and soluble organic fractions (SOFs) comprising high-boiling-point hydrocarbons, which are likely to adversely affect humans and environment when discharged into the air. Accordingly, ceramic honeycomb filters for capturing PM have conventionally been attached to exhaust pipes of diesel engines.

Figure 1:
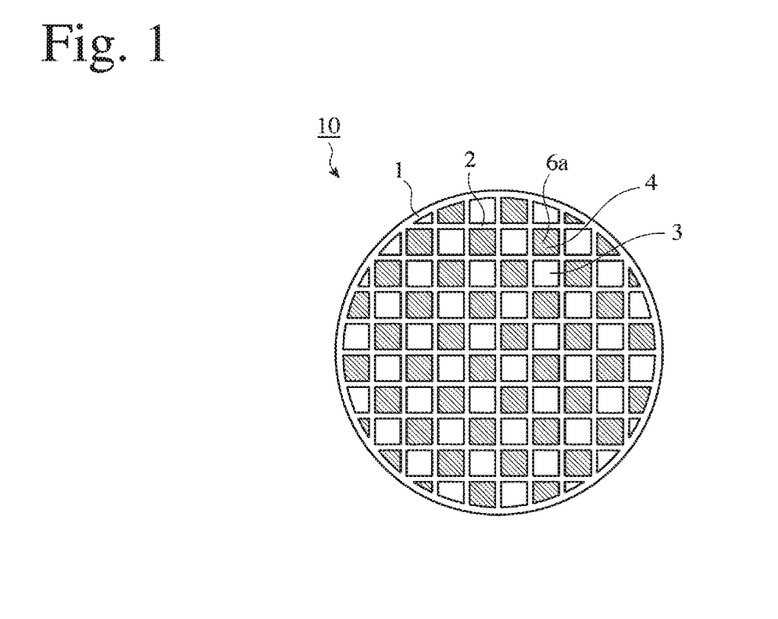
FIG. 1 is a front view schematically showing an example of ceramic honeycomb filters.
Figure 2:
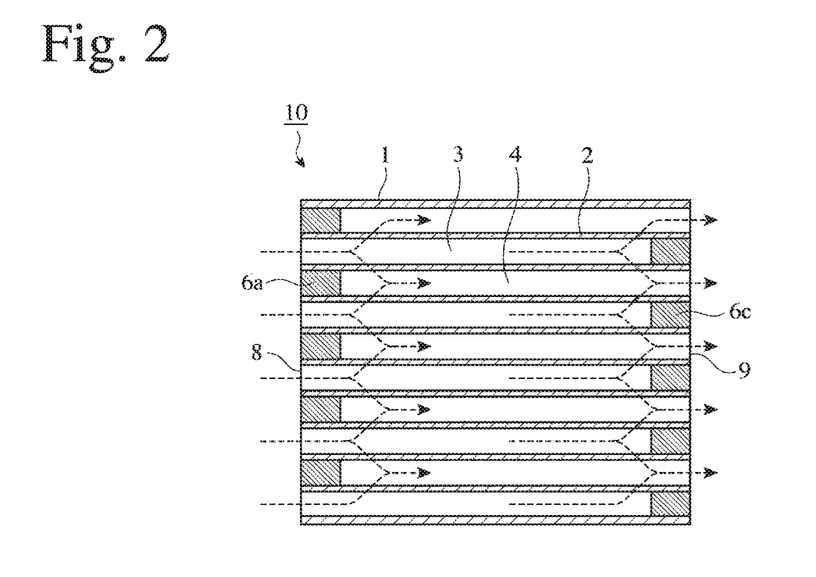
FIG. 2 is a schematic cross-sectional view longitudinally showing an example of ceramic honeycomb filters.

An example of ceramic honeycomb filters for capturing PM in exhaust gases to clean them is shown in FIGS. 1 and 2. The ceramic honeycomb filter 10 comprises a ceramic honeycomb structure comprising porous cell walls 2 defining a large number of outlet-side-plugged flow paths 3 and inlet-side-plugged flow paths 4, and a peripheral wall 1; and upstream-side plugs 6a and downstream-side plugs 6c sealing the exhaust-gas-inlet-side end surface 8 and exhaust-gas-outlet-side end surface 9 of the outlet-side-plugged flow paths 3 and the inlet-side-plugged flow paths 4 alternately in a checkerboard pattern. The peripheral wall 1 of the ceramic honeycomb filter is fixed by grip members (not shown) of metal meshes or ceramic mats, etc. to prevent movement during operation, and disposed in a metal container (not shown).

In the ceramic honeycomb filter 10, an exhaust gas is cleaned as follows. As shown by dotted arrows in FIG. 2, an exhaust gas flows into the outlet-side-plugged flow paths 3 open on the exhaust-gas-inlet-side end surface 8. While passing through the cell walls 2, particularly through communicating pores on and in the cell walls 2, PM is captured, cleaning the exhaust gas. The cleaned exhaust gas flows from the inlet-side-plugged flow paths 4 open on the exhaust-gas-outlet-side end surface 9 to the air.

PM continuously captured by the cell walls 2 clogs communicating pores on and in the cell walls, resulting in increased pressure loss when the exhaust gas passes through the ceramic honeycomb filter. Accordingly, PM should be burned off to regenerate the ceramic honeycomb filter before the pressure loss reaches a predetermined level.

The ceramic honeycomb filter should meet the requirements of a high capturing ratio of particulate matter and low pressure loss. However, because these requirements are in a contradictory relation, the optimization of porosity, pore volume, pores on the cell wall surface, etc. to meet both requirements has conventionally been investigated.

Further, to meet recent stricter exhaust gas regulations, investigations have been conducted to provide exhaust-gas-cleaning apparatuses comprising both SCR apparatuses for removing NOx and honeycomb filters for removing particulate matter. Thus, the honeycomb filters are required to have higher pressure loss characteristics than ever.

PM comprises numerous so-called nano-particles having diameters of 50 nm or less. Nano-particles are more accumulated in respiratory organs than larger particles having the same mass when inhaled. Also, because nano-particles have larger surface areas per volume, they become more harmful when toxic chemical substance is adsorbed to their surfaces. Because the mass of nano-particles contained in PM is small, a current PM mass limit is insufficient, and it is expected to implement a particle number limit for suppressing the emission of nano-particles largely affecting the number of particles discharged, as a future exhaust gas regulation. Accordingly, the honeycomb filters are required to have not only excellent pressure loss characteristics, but also an improved capturing ratio of PM, particularly an improved number-based capturing ratio of nano-particles, instead of the current mass-based capturing ratio of PM.

JP 2005-530616 A discloses a ceramic filter constituted by a cordierite honeycomb structure with ends plugged for capturing and burning particulate matter discharged from diesel engines, $d50/(d50+d90)$ determined from a pore diameter distribution being less than 0.70, a permeability factor Sf when soot is accumulated, which is defined by the formula of $[d50/(d50+d90)]/[\text{porosity (\%)}/100]$ being less than 1.55, and a thermal expansion coefficient (25° C. to 800° C.) being $17 \times 10^{-7}$/° C. or less, describing that with such a pore structure (pore diameter distribution and pore communication), low pressure loss can be kept even, when PM is accumulated.

JP 2002-219319 A discloses a porous honeycomb filter made of cordierite as a main crystal phase, which has a controlled pore diameter distribution, the pore diameter distribution being such that the volume of pores having pore diameters of less than 10 μm is 15% or less of the total pore volume, the volume of pores having pore diameters of 10-50 μm is 75% or more of the total pore volume, and the volume of pores having pore diameters exceeding 50 μm is 10% or less of the total pore volume. JP 2002-219319 A describes that because of the above pore diameter distribution, this porous honeycomb filter has high efficiency of capturing PM, etc., with suppressed pressure loss increase due to the clogging of pores. JP 2002-/19319 A also describes that such pore diameter distribution can be controlled by adjusting the particle diameters of a silica component, one of cordierite-forming materials, and by lowering the concentration of kaolin.

JP 2003-40687 A discloses a ceramic honeycomb structure composed of cordierite as a main component, and having porosity of 55-65% and an average pore diameter of 15-30 μm, the total area of pores open on the cell wall surfaces being 35% or more of the total cell wall surface area. JP 2003-40687 A describes that this ceramic honeycomb structure exhibits high capturing efficiency with low pressure loss.

Though the exhaust-gas-cleaning filters described in JP 2005-530616 A, JP 2002-219319 A and JP 2003-40687 A exhibit relatively high PM-capturing performance by the accumulation of PM, such PM-capturing performance is not necessarily sufficient at an early stage of use before PM is accumulated (when the ceramic honeycomb filters start to be freshly used or reused after regeneration). Particularly, they have insufficient capturing efficiency of nano-sized PM thought to be harmful by the stricter exhaust gas regulations, causing the problem that uncaptured harmful nano-sized PM is released.

JP 2004-360654 A discloses a ceramic honeycomb filter whose cell walls have porosity of 55-75% and an average pore diameter of 15-40 μm, the total area of pores open on the cell wall surface being 10-30% of the total cell wall surface area, and the number of pores having equivalent circle diameters of 5-20 μm being 300/mm² or more among those open on the cell wall surfaces. However, even the ceramic honeycomb filter described in JP 2004-360654 A fails to effectively capture nano-particles at an early stage of use before PM is accumulated, though a mass-based capturing ratio of PM is improved to some extent. Namely, it has a low number-based capturing efficiency of PM, less expected to meet the particle number limit.

WO 2011/102487 A1 discloses a ceramic honeycomb structure comprising cell walls having (a) porosity of 55-80%, and (b) a median pore diameter d50 of 5-27 μm when measured by mercury porosimetry; (c) an area ratio of pores open on the surface being 20% or more; (d) an area-based median pore opening diameter d50 (expressed by an equivalent circle diameter) of pores open on the surface being 10-45 μm; (e) the density of pores open on the surface, which have equivalent circle diameters of 10 μm or more and less than 40 μm, being 350/mm² or more; (f) the maximum inclination of a curve of a cumulative pore volume to a pore diameter, which is obtained from the pore diameter distribution measured by mercury porosimetry, being 1.6 or more; and (g) a ratio D50/d50 of the median pore diameter d50 and the median pore opening diameter d50 being 0.65 or less. WO 2011/102487 A1 describes that a ceramic honeycomb filter constituted by this ceramic honeycomb structure can effectively capture nano-particles largely affecting the number of particles discharged even at an early stage of use before PM is accumulated, resulting in an improved number-based capturing ratio of PM, with less deterioration of pressure loss characteristics after captured PM is accumulated.

However, when a ceramic honeycomb filter constituted by the ceramic honeycomb structure described in WO 2011/1.02487 A1 is used as an exhaust gas filter for diesel engine cars, a capturing ratio of namo-sized PM may be insufficient in a driving mode, in which driving and stopping are repeated on city roads, etc. Thus, further improvement of the number-based capturing ratio of PM is desired to meet increasingly stricter exhaust gas regulations.

JP 2009-517327 A discloses a porous cordierite honeycomb having increased mechanical strength and heat shock resistance, which has an average CTE of $9 \times 10^{-7}$/° C. or less between 25° C. and 800° C., and meets $M_A$<2220, and $M_T$>2660, wherein $M_A$=3645 ($I_A$)−106 (CTE)+19 (d90)+17 (porosity %), and $M_T$=4711 ($I_T$)+116 (CTE)−26 (d90)−28 (porosity %), $I_A$ is an I ratio of XRD measured in a longitudinal cross section of the honeycomb, and $I_T$ is an I ratio of XRD measured on cell wall surfaces of the honeycomb. JP 2009-517327 A describes that the porous honeycomb preferably has porosity of 40% or more and less than 54%, and a median pore diameter of 10 μm or more.

JP 2011-516371 A discloses a porous ceramic body formed by a polycrystalline ceramic having an anisotropic-fine structure, which is constituted by oriented polycrystalline networks (reticular formations) having an anisotropic factor Af-pore-long meeting 1.2<Af-pore-long<5. JP 2011-516371 A describes that the ceramic body has a narrow pore diameter distribution and porosity of more than 50%, a median pore diameter being in a range of 12-25 μm. It describes that this ceramic body exhibiting high strength, a low thermal expansion coefficient (CTE), and high porosity can be used for automobile substrates, particulate-removing filters for diesel engines and gasoline engines, functional filters such as catalyst filters having a partial or complete addition of NOx, etc.

WO 2011/027837 A1 discloses a ceramic honeycomb structure comprising cell walls having porosity of 40-60%; an opening area ratio of pores open on the cell wall surfaces (the total area of pore openings per a unit area of cell wall surfaces) being 15% or more; an area-based median opening diameter of pores open on the cell wall surfaces, which is expressed by an equivalent circle diameter (diameter of a circle having the same area as the opening area of each pore), being 10 μm or more and less than 40 μm; the density of pores having equivalent circle diameters of 10 μm or more and less than 40 μm being 350/mm² or more; and the average circularity of pores having equivalent circle diameters of 10 μm or more and less than 40 μm being 1-2. WO 2011/027837 A1 describes that the ceramic honeycomb structure has an improved PM-capturing ratio with low pressure loss at an early stage after regeneration, thereby enabling the efficient capturing of namo-sized PM, which has been increasingly needed because of stricter exhaust gas regulations.

WO 2007/108428 A1 discloses a method for producing a honeycomb structure by using an alumina source, a silica source, and a magnesia source each having a 50-volume-% particle diameter V50 (μm) of 1-25 μm in a volume-based particle diameter distribution; and using a cordierite-forming material having a volume-based particle diameter ratio ($V_{all}90/V_{all}10$) of 10 or less, wherein $V_{all}10$ is a particle diameter at 10% by volume, and $V_{all}90$ is a particle diameter at 90% by volume, in a volume-based particle diameter distribution of the entire cordierite-forming material; and the difference between $V_{all}90$ and $V_{all}1.0$ [width of a volume-based particle diameter distribution ($V_{all}90-V_{all}10$)] being 25 m or less. WO 2007/108428 A1 describes that a honeycomb structure obtained has high porosity and a sharp pore diameter distribution, useful for exhaust-gas-capturing filters, particularly for diesel particulate filters (DPF) for capturing particulate matter, etc. in exhaust gases discharged from diesel engines.

However, when the honeycombs described in JP 2009-517327 A, JP 2011-516371 A, WO 2011/027837 A1 and WO 2007/108428 A1 are used for exhaust-gas-cleaning filters, their PM-capturing performance is not necessarily sufficient at an early stage of use before PM is accumulated (when ceramic honeycomb filters start to be freshly used or reused after regeneration), though it becomes high as PM is accumulated to some extent. Particularly the capturing efficiency of namo-sized PM, which has become important due to stricter exhaust gas regulations, is insufficient, failing to capture harmful namo-sized PM.

OBJECT OF THE INVENTION

Accordingly, an object of the present invention is to provide a ceramic honeycomb structure effectively capturing nano-particles largely affecting the number of discharged particles, thereby exhibiting an improved number-based capturing ratio of PM, even before PM is accumulated at an early stage of use, and less suffering the deterioration of pressure loss characteristics even when captured PM is accumulated, and its production method.

SUMMARY OF THE INVENTION

Thus, the ceramic honeycomb structure of the present invention has pluralities of flow paths partitioned by porous cell walls;

(a) the cell walls having porosity of 50-60%; and (b) in a pore diameter distribution in the cell walls measured by mercury porosimetry, (i) a pore diameter d5 at a cumulative pore volume corresponding to 5% of the total pore volume being 22 μm or more and less than 55 μm, a pore diameter d10 at 10% being 15-35 μm, a pore diameter (median pore diameter) d50 at 50% being 10-20 μm, a pore diameter d85 at 85% being 5-9 μm, a pore diameter d90 at 90% being 3-8 μm, a pore diameter d98 at 98% being 2.5 μm or less, (d10−d90)/d50 being 1.3-1.8, (d50−d90)/d50 being 0.45-0.75, and (d10−d50)/d50 being 0.75-1.1; and (ii) σ[=log d20−log d80] being 0.39 or less, wherein σ represents the difference between a logarithm of the pore diameter d20 at a cumulative pore volume corresponding to 20% of the total pore volume and a logarithm of the pore diameter d80 at 80%.

The pore diameter d2 at a cumulative pore volume corresponding to 2% of the total pore volume is preferably 75-250 μm, and the volume of pores of 20 μm or more is preferably 0.12 cm$^3$/g or less.

The porosity is preferably 52-60%. The median pore diameter d50 is preferably 10-18 μm. The σ is preferably 0.3 or less.

The method of the present invention for producing the above ceramic honeycomb structure comprises the steps of extrusion-molding a moldable material comprising a ceramic material and hollow resin particles as a pore-forming material to a predetermined green body, and drying and sintering the green body;

the moldable material comprising 3-9% by mass of the pore-forming material per 100% by mass of the ceramic material;

the pore-forming material having a median particle diameter D50 of 20-53 μm, a particle diameter D5 at a cumulative volume corresponding to 5% of the total volume being 12-27 μm, a particle diameter D10 at a cumulative volume corresponding to 10% of the total volume being 15-30 μm, a particle diameter D90 at a cumulative volume corresponding to 90% of the total volume being 50-75 μm, a particle diameter D95 at a cumulative volume corresponding to 95% of the total volume being 60-90 μm, and D50/(D90−D10) being 0.85-1.30, in a curve of a cumulative volume to a particle diameter;

the ceramic material comprising 15-25% by mass of silica, 40-43% by mass of talc, and 15-30% by mass of alumina per 100% by mass of the ceramic material;

the silica having a median particle diameter D50 of 15-30 μm, D10 of 10-20 μm, and D90 of 40-60 μm, the percentage of particles having diameters of 5 μm or less being 1% or less by mass, the percentage of particles having diameters of 10 μm or less being 3% or less by mass, the percentage of particles having diameters of 100 μm or more being 3% or less by mass, the percentage of particles having diameters of 200 μm or more being 1% or less by mass, and a particle diameter distribution deviation SD [=log D80−log D20] being 0.4 or less, wherein D20 represents a particle diameter at a cumulative volume corresponding to 20% of the total volume, D80 represents a particle diameter at a cumulative volume corresponding to 80% of the total volume, and D20<D80, in a curve of a cumulative volume to a particle diameter;

the talc having a median particle diameter D50 of 5-15 μm, D10 of 10 μm or less, and D90 of 25 μm or more; and the alumina having a median particle diameter D50 of 3-6 μm, and D90 of 20 μm or less, the percentage of particles having diameters of 25 μm or more being 0.4% or less by mass.

The moldable material preferably comprises 3.5-8% by mass of the pore-forming material per 100% by mass of the ceramic material.

Effects of the Invention

A filter constituted by the ceramic honeycomb structure of the present invention can effectively capture name-sized PM largely affecting the number of particles in an exhaust gas, even at an early stage of use before PM is accumulated (when a ceramic honeycomb filter starts to be freshly used or reused after regeneration), resulting in an improved number-based capturing ratio of PM, without deteriorating pressure loss characteristics when captured PM is accumulated. Accordingly, it can meet stricter exhaust gas regulations.

DESCRIPTION OF THE PREFERRED EMBODIMENTS

[1] Ceramic Honeycomb Structure

The ceramic honeycomb structure of the present invention comprises pluralities of flow paths partitioned by porous cell walls, (a) the cell walls having porosity of 50-60%; and (b) in a pore diameter distribution in the cell walls measured by mercury porosimetry, (i) a pore diameter d5 at a cumulative pore volume corresponding to 5% of the total pore volume being 22 μm or more and less than 55 μm, a pore diameter d10 at 10% being 15-35 μm, a pore diameter (median pore diameter) d50 at 50% being 10-20 μm, a pore diameter d85 at 85% being 5-9 μm, a pore diameter d90 at 90% being 3-8 μm, a pore diameter d98 at 98% being 2.5 μm or less, (d10−d90)/d50 being 1.3-1.8, (d50−d90)/d50 being 0.45-0.75, and (d10−d50)/d50 being 0.75-1.1; and (ii) σ[=log d20−log d80] being 0.39 or less, wherein σ represents the difference between a logarithm of the pore diameter d20 at a cumulative pore volume corresponding to 20% of the total pore volume and a logarithm of the pore diameter d80 at 80%.

The ceramic honeycomb structure having such a structure can effectively capture fine PM largely affecting the number of particles discharged even at an early stage of use before PM is accumulated (when a ceramic honeycomb filter starts to be freshly used or reused after regeneration), resulting in an improved number-based capturing ratio of PM, with less deterioration of pressure loss characteristics when captured PM is accumulated.

(a) Porosity of Cell Walls

The cell walls have porosity of 50-60%. When the porosity is less than 50%, it is difficult to keep low pressure loss when captured PM is accumulated. The porosity of more than 60% reduces a capturing ratio of namo-sized PM. The porosity is preferably 52-60%, more preferably 54-59%. The porosity of cell walls is measured by mercury porosimetry described below.

(b) Pore Distribution of Cell Walls (i) d2, d5, d10, d50, d85, d90 and d98

Figure 3:
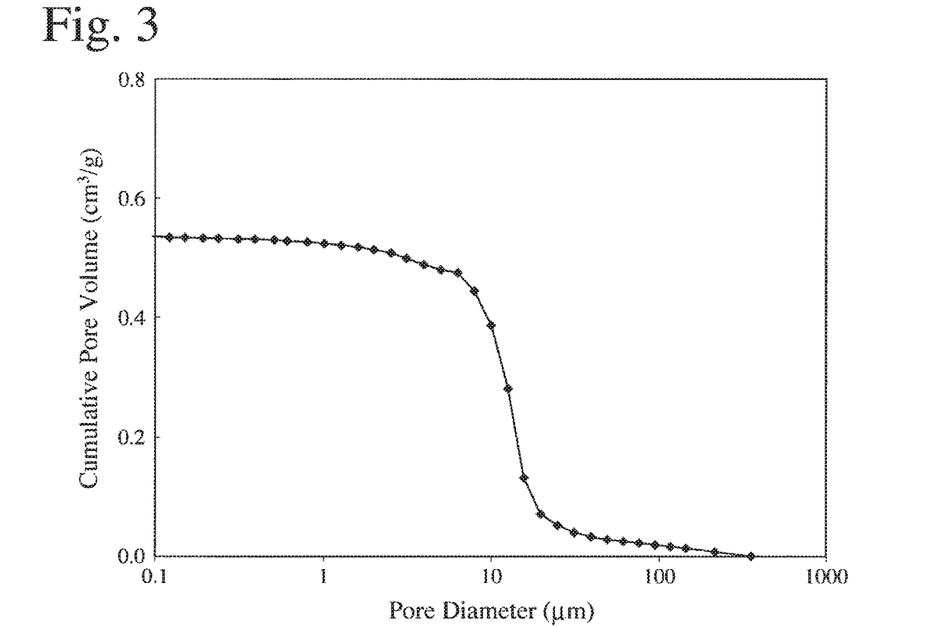
FIG. 3 is a graph showing the relation between the pore diameter and cumulative pore volume of cell walls measured by mercury porosimetry in the ceramic honeycomb structure of Example 1.

In a pore diameter distribution curve of cell walls measured by mercury porosimetry, a pore diameter d5 at a cumulative pore volume corresponding to 5% of the total pore volume is 22 µm or more and less than 55 µm, a pore diameter d10 at 10% is less than 15-35 µm, a pore diameter (median pore diameter) d50 at 50% is 10-20 µm, a pore diameter d85 at 85% is 5-9 µm, a pore diameter d90 at 90% is 3-8 µm, a pore diameter d98 at 98% is 2.5 µm or less, (d10−d90)/d50 is 1.3-1.8, (d50−d90)/d50 is 0A5-0.75, and (d10−d50)/d50 is 0.75-1.1. Further, a pore diameter d2 at a cumulative pore volume corresponding to 2% of the total pore volume is preferably 75-250 µm. A pore diameter distribution curve of cell walls measured by mercury porosimetry is a curve of a cumulative pore volume plotted against a pore diameter (cumulative pore volume curve), which shows a cumulative pore volume in a range from a large pore diameter to a small pore diameter, for example, as shown in FIG. 3. It should be noted that d2>d5>d10>d50>d85>d90>d98.

The pore diameter d2 at a cumulative pore volume corresponding to 2% of the total pore volume is preferably 75-250 µm. When the pore diameter d2 is less than 75 µm, it is difficult to keep low pressure loss when captured PM is accumulated. The pore diameter d2 of more than 250 µm likely reduces a capturing ratio of namo-sized PM. d2 is preferably 80-240 µm, more preferably 90-230 µm.

The pore diameter d5 at a cumulative pore volume corresponding to 5% of the total pore volume is 22 µm or more and less than 55 µm. When the pore diameter d5 is less than 22 µm, it is difficult to keep low pressure loss when captured PM is accumulated. When it is 55 µm or more, it is difficult to effectively capture nano-sized PM. d5 is preferably 28-54 µm, more preferably 33-53 µm.

The pore diameter d10 at a cumulative pore volume corresponding to 10% of the total pore volume is 15-35 µm. When the pore diameter d10 is less than 15 µm, it is difficult to keep low initial pressure loss at the start of use. The pore diameter d10 of more than 35 µm reduces a capturing ratio of namo-sized PM. d10 is preferably 21-45 µm, more preferably 22-40 µm.

The median pore diameter d50 is 10-20 µm. When the median pore diameter d50 is less than 10 µm, it is difficult to keep low initial pressure loss at the start of use. The median pore diameter 50 of more than 20 µm reduces the percentage of pores having diameters of 10-20 µm effective for capturing PM, resulting in a low capturing ratio of namo-sized PM. The median pore diameter d50 is preferably 12-18 µm, more preferably 13-16 µm.

The pore diameter d85 at a cumulative pore volume corresponds to 85% of the total pore volume is 5-9 µm. When the pore diameter d85 is less than 5 µm, it is difficult to keep low initial pressure loss at the start of use. d85 is preferably 5.5 µm or more, more preferably 6 µm or more. On the other hand, the pore diameter d85 of more than 9 µm reduces a capturing ratio of namo-sized PM. d85 is preferably 8.5 µm or less.

The pore diameter d90 at a cumulative pore volume corresponding to 90% of the total pore volume is 3-8 µm. When the pore diameter d90 is less than 3 µm, it is difficult to keep low initial pressure loss at the start of use. d90 is preferably 3.5 µm or more, more preferably 4.5 µm or more. On the other hand, the pore diameter d90 of more than 8 µm reduces a capturing ratio of nano-sized PM. d90 is preferably 7.5 µm or less, more preferably 7 µm or less.

The pore diameter d98 at a cumulative pore volume corresponding to 98% of the total pore volume is 2.5 µm or less. The pore diameter d98 of more than 2.5 µm reduces a capturing ratio of namo-sized PM. d98 is preferably 2 µm or less, more preferably 1.5 µm or less.

(d10−d90)/d50 is 1.3-1.8. When (d10−d90)/d50 is less than 1.3, it is difficult to keep low pressure loss when captured PM is accumulated. On the other hand, when it is more than 2, it is difficult to keep low initial pressure loss at the start of use. (d10−d90)/d50 is preferably 1.35-1.7, more preferably 1.4-1.6.

(d50−d90)/d50 is 0.45-0.75. When (d50−d90)/d50 is less than 0.45, it is difficult to keep low pressure loss when captured PM is accumulated. On the other hand, (d50−d90)/d50 of more than 0.75 reduces a capturing ratio of name-sized PM. (d50−d90)/d50 is preferably 0.5-0.7, more preferably 0.55-0.65, further preferably 0.55-0.60.

(d10−d50)/d50 is 0.75-1.1. When (d10−d50)/d50 is less than 0.75, it is difficult to keep low pressure loss when captured PM is accumulated. On the other hand, (d10−d50)/d50 of more than 1.1 reduces a capturing ratio of namo-sized PM. (d10−d50)/d50 is preferably 0.8-1.05, more preferably 0.85-1.0.

(ii) Difference σ Between Logarithm of d20 and Logarithm of d80

In a pore diameter distribution curve of cell walls measured by mercury porosimetry, σ[=log d20−log d80] is 0.39 or less, wherein a is the difference between a logarithm of the pore diameter d20 at a cumulative pore volume corresponding to 20% of the total pore volume and a logarithm of the pore diameter d80 at 80%. When σ is more than 0.39, it is difficult to keep low initial pressure loss at the start of use. σ is preferably 0.3 or less, more preferably 0.25 or less.

(iii) Volume of pores of more than 100 µm and volume of pores of 20 µm or more

In a pore diameter distribution curve of cell walls measured by mercury porosimetry, the volume of pores of more than 100 µm is preferably 0.03 cm$^3$/g or less. When the volume of pores of more than 100 µm is more than 0.03 cm$^3$/g, a capturing ratio of namo-sized PM is low. The volume of pores of more than 100 µm is preferably 0.025 cm$^3$/g or less, more preferably 0.02 cm$^3$/g or less. When the above conditions that the porosity is 50-60%, and that the pore diameter d5 at a cumulative pore volume corresponding to 5% of the total pore volume is 22 µm or more and less than 55 µm are met, the condition that the volume of pores of more than 100 µm is 0.03 cm$^3$/g or less is inevitably met. The volume of pores of 20 µm or more is preferably 0.12 cm$^3$/g or less. When the volume of pores of 20 µm or more is more than 0.12 cm$^3$/g, it is difficult to capture nano-sized PM effectively. The volume of pores of 20 μm or more is preferably 0.10 cm$^3$/g or less, more preferably 0.08 cm$^3$/g or less.

(iv) Mercury Porosimetry

The measurement of a cumulative pore volume by mercury porosimetry can be conducted by Autopore III 9410 available from Micromeritics. This measurement is conducted by setting a test piece (10 mm×10 mm×10 mm) cut out of the ceramic honeycomb structure in a measurement cell, evacuating the cell, and then introducing mercury into the cell under pressure to measure the volume of mercury forced into pores in the test piece. Because mercury is introduced into finer pores at higher pressure, the relation between a pore diameter and a cumulative pore volume (cumulative volume of pores in a range from the maximum pore diameter to a particular pore diameter) determined from the relation between pressure and the volume of mercury intruded into pores. Mercury is first introduced into large pores and then into smaller pores successively. The pressure is converted to a pore diameter, and cumulation is conducted from larger pore diameters to smaller pore diameters to determine a cumulative pore volume (corresponding to the volume of mercury), which is plotted against a pore diameter to obtain a graph showing the relation between a pore diameter and a cumulative pore volume as shown in FIG. 3. Herein, the pressure of introducing mercury is 0.5 psi (0.35×10$^{-3}$ kg/mm$^2$), and a cumulative pore volume at mercury pressure of 1800 psi (1.26 kg/mm$^2$, corresponding to a pore diameter of about 0.1 μm) is regarded as the total pore volume.

From the mercury porosimetry measurement results, the total pore volume, porosity, a pore diameter d2 (μm) at a cumulative pore volume corresponding to 2% of the total pore volume, a pore diameter d5 (μm) at 5%, a pore diameter d10 (μm) at 10%, a pore diameter d20 (μm) at 20%, a pore diameter (median pore diameter) d50 (μm) at 50%, a pore diameter d80 (μm) at 80%, a pore diameter d85 (μm) at 85%, a pore diameter d90 (μm) at 90%, a pore diameter d98 (μm) at 98%, the volume of pores of more than 100 μm, (d10−d90)/d150, (d50−d90)/d50, and (d10−d50)/d50 are determined, and σ[=log d20−log d80], which is the difference between a logarithm of the pore diameter d20 at a cumulative pore volume corresponding to 20% of the total pore volume and a logarithm of the pore diameter d80 at 80%, is calculated.

The porosity can be calculated from the measured total pore volume and the true specific gravity of a cell wall material. For example, when the cell walls of a ceramic honeycomb structure are made of cordierite, the porosity is calculated by [2.52V/(1+2.52V)]×100(%), wherein V is the total pore volume, using the true specific gravity of 2.52 g/cm$^3$ for cordierite.

(c) Thermal Expansion Coefficient

The ceramic honeycomb structure preferably has a thermal expansion coefficient of 13×10$^{-7}$/° C. or less between 20° C. and 800° C. in a flow path (A-axis) direction. Because the ceramic honeycomb structure having such a thermal expansion coefficient has high heat shock resistance, it is sufficiently acceptable for practical use as a ceramic honeycomb filter for removing particulate matter from exhaust gases of diesel engines. The thermal expansion coefficient is preferably 3×10$^{-7}$/° C. to 11×10$^{-7}$/° C.

(d) Cell Wall Structure

The ceramic honeycomb structure preferably has an average cell wall thickness of 9-15 mil (0.229-0.381 mm), and an average cell density of 150-300 cpsi (23.3-46.5 cells/cm$^2$). With such cell wall structure, the ceramic honeycomb structure can keep low pressure loss at the start of use, resulting in an improved number-based PM-capturing ratio, and improved pressure loss characteristics when captured PM is accumulated. When the average cell wall thickness is less than 9 mil, the cell walls have low strength. When the average cell wall thickness is more than 15 mil, it is difficult to keep low pressure loss. When the average cell density is less than 150 cpsi, the cell walls have low strength. When the average cell density is more than 300 cpsi, it is difficult to keep low pressure loss. The flow path cross sections of cells may be polygonal (square, hexagonal, etc.), circular, elliptical, etc., and they may be asymmetric with different sizes between the inlet-side end and the outlet-side end.

(e) Materials of Cell Walls

Materials for cell walls are preferably heat-resistant ceramics, such as alumina, mullite, cordierite, silicon carbide, silicon nitride, zirconia, aluminum titanate, lithium aluminum silicate, etc. as main crystals, because the honeycomb structure is used as a filter for cleaning exhaust gases discharged from diesel engines. Preferable among them are ceramics such as cordierite or aluminum titanate as main crystals having excellent heat shock resistance with low thermal expansion. When the main crystal phase is cordierite, other crystal phases such as spinel, mullite, sapphirine, etc. may be contained, and glass components may also be contained. When the main crystal phase is aluminum titanate, elements such as Mg, Si, etc. may be dissolved in the aluminum titanate crystal phase, which may contain other crystal phases such as mullite, etc., and glass components as grain boundary phases.

[2] Ceramic Honeycomb Filter

A ceramic honeycomb filter is obtained by alternately plugging the inlet or outlet side of exhaust gas flow paths of the ceramic honeycomb structure of the present invention. The use of the ceramic honeycomb structure of the present invention provides a ceramic honeycomb filter with an improved number-based capturing ratio of PM while keeping low pressure loss at an early stage of use, and improved pressure loss characteristics when captured PM is accumulated. Plugs need not be formed at inlet or outlet ends of exhaust gas flow paths, but may be formed inside the inlet or outlet ends of flow paths.

[3] Production Method of Ceramic Honeycomb Structure

The method of the present invention for producing a ceramic honeycomb structure comprises the steps of extrusion-molding a moldable material comprising a ceramic material and hollow resin particles as a pore-forming material to a predetermined green body, and drying and sintering the green body;

the moldable material comprising 3-9% by mass of the pore-forming material per 100% by mass of the ceramic material;

the pore-forming material having a median particle diameter D50 of 20-53 μm, a particle diameter D5 at a cumulative volume corresponding to 5% of the total volume being 12-27 μm, a particle diameter D10 at a cumulative volume corresponding to 10% of the total volume being 15-30 μm, a particle diameter D90 at a cumulative volume corresponding to 90% of the total volume being 50-75 μm, a particle diameter D95 at a cumulative volume corresponding to 95% of the total volume being 60-90 μm, and D50/(D90−D10) being 0.85-1.30, in a curve of a cumulative volume to a particle diameter;

the ceramic material comprising 15-25% by mass of silica, 40-43% by mass of talc, and 15-30% by mass of alumina, per 100% by mass of the ceramic material;

the silica having a median particle diameter D50 of 15-30 μm, D10 of 10-20 μm, and D90 of 40-60 μm, the percentage of particles having diameters of 5 μm or less being 1% or less by mass, the percentage of particles having diameters of 10 μm or less being 3% or less by mass, the percentage of particles having diameters of 100 μm or more being 3% or less by mass, and the percentage of particles having diameters of 200 μm or more being 1% or less by mass, and a particle diameter distribution deviation SD [=log D80−log D20] being 0.4 or less, wherein D20 represents a particle diameter at a cumulative volume corresponding to 20% of the total volume, D80 represents a particle diameter at a cumulative volume corresponding to 80% of the total volume, and D20<D80, in a curve of a cumulative volume to a particle diameter;

the talc having a median particle diameter D50 of 5-15 μm, D10 of 10 μm or less, and D90 of 25 μm or more; and the alumina having a median particle diameter D50 of 3-6 μm, and D90 of 20 μm or less, the percentage of particles having diameters of 25 μm or more being 0.4% or less by mass.

Such a method can produce the ceramic honeycomb structure of the present invention having pluralities of flow paths partitioned by porous cell walls, (a) the cell walls having porosity of 50-60%; and (b) in a pore diameter distribution in the cell walls measured by mercury porosimetry, (i) a pore diameter d2 at a cumulative pore volume corresponding to 2% of the total pore volume being 75-250 μm, a pore diameter d5 at 5% being 22 μm or more and less than 55 μm, a pore diameter d10 at 10% being 15-35 μm, a pore diameter (median pore diameter) d50 at 50% being 110-20 μm, a pore diameter d85 at 85% being 5-9 μm, a pore diameter d90 at 90% being 3-8 μm, pore diameter d98 at 98% being 2.5 μmy or less, (d10−d90)/d50 being 1.3-1.8, (d50−d90)/d50 being 0.45-0.75, and (d10−d50)/d50 being 0.75-1.1; and (ii) σ[=log d20−log d80] being 0.39 or less, wherein a represents the difference between a logarithm of the pore diameter d20 at a cumulative pore volume corresponding to 20% of the total pore volume and a logarithm of the pore diameter d80 at 80%.

Pores formed in the ceramics are composed of those formed by melting the ceramic material during a sintering process, and those generated by burning off the pore-forming material. Accordingly, the sizes of pores generated by sintering ceramics can be controlled by adjusting the median particle diameters and particle diameter distributions of the ceramic material and the pore-forming material in the above ranges.

When a green body comprising the ceramic material and hollow resin particles as the pore-forming material is sintered in the production method of the present invention, the resin particles are burned off, leaving pores, and the ceramic material is sintered to form pores. In the present invention, by using hollow resin particles generating less heat by burning than solid resin particles, less cracking occurs in the sintering process of the green body. Pores formed by sintering the ceramic material are communicative with pores generated by burning the resin particles, so that the cell walls can have pores in the above diameter ranges measured by mercury porosimetry and well communicative from the surfaces to inside of the cell walls.

Thus, pores formed by sintering the ceramic material and pores generated by burning the pore-forming material are in predetermined diameter ranges for good communication, providing the ceramic honeycomb structure of the present invention exhibiting an improved capturing ratio of namo-sized PM, and improved pressure loss characteristics when captured PM is accumulated.

(1) Pore-Forming Material

In the present invention, hollow resin particles are used as the pore-forming material in an amount of 3-9% by mass per 100% by mass of the ceramic material. Outside the above amount range of the pore-forming material, it is difficult to form cell walls having the above pore structure. When the pore-forming material added is less than 3% by mass, it is difficult to form cell walls having porosity of 50% or more, resulting in deteriorated pressure loss characteristics when captured PM is accumulated. When the pore-forming material added exceeds 9% by mass, the porosity of cell walls may exceed 60%, resulting in a low capturing ratio of namo-sized PM. The pore-forming material added is preferably 3.5-8% by mass, more preferably 4-7% by mass.

The pore-forming material particles have a median particle diameter D50 of 20-53 μm. With the median particle diameter D50 of less than 20 μm, low pressure loss cannot be maintained when PM is captured and accumulated. When the median particle diameter D50 is more than 53 μm, large pores are formed, resulting in a low capturing ratio of namo-sized PM. The median particle diameter D50 of the pore-forming material particles is preferably 25-50 μm, more preferably 30-50 μm.

In the curve of a cumulative volume (accumulated volume of particles having up to a particular diameter) to a particle diameter in the pore-forming material particles, a particle diameter D5 at a cumulative volume corresponding to 5% of the total volume is 12-27 μm, a particle diameter D10 at a cumulative volume corresponding to 10% of the total volume is 15-30 μm, a particle diameter D90 at a cumulative volume corresponding to 90% of the total volume is 50-75 μm, a particle diameter D95 at a cumulative volume corresponding to 95% of the total volume is 60-90 μm, and D50/(D90−D10) is 0.9-1.3. With the pore-forming material particles having such particle diameter distribution, and the ceramic material having adjusted particle diameters and particle diameter distribution as described below, the cell walls having the above pore structure can be easily obtained. The particle diameter D5 at a cumulative volume corresponding to 5% of the total volume is preferably 14-25 μm, more preferably 16-23 μm. The particle diameter D10 at a cumulative volume corresponding to 10% of the total volume is preferably 17-28 μm, more preferably 19-26 μm. The particle diameter D90 at a cumulative volume corresponding to 90% of the total volume is preferably 55-72 μm, more preferably 56-70 μm, most preferably 56 μm or more and less than 66 μm. The particle diameter D95 at a cumulative volume corresponding to 95% of the total volume is preferably 65-88 μm, more preferably 67-85 μm, most preferably 67-80 μm. D50/(D90−D10) is preferably 0.90-1.20, more preferably 1.0-1.15. The particle diameters of the pore-forming material can be measured by a particle diameter distribution meter (Microtrack MT3000 available from Nikkiso Co., Ltd.).

The pore-forming material particles preferably have sphericity of 0.5 or more. When the pore-forming material particles have sphericity of less than 0.5, the cell walls undesirably have pluralities of pores having sharp corners, which act as the starting sites of breakage, providing the honeycomb structure with low strength. The sphericity of the pore-forming material particles is preferably 0.7 or more, more preferably 0.8 or more. The sphericity of each pore-forming material particle is determined by dividing a projected area of the pore-forming material particle by the area of a circle having a diameter corresponding to the longest straight line connecting two points on a periphery of the pore-forming material particle through its center of gravity, and can be measured on an electron photomicrograph by an image analyzer.

The hollow resin particles are preferably foamed resin particles. Resins for the pore-forming material particles are suitably polymethylmethacrylate, polybutylmethacrylate, polyacrylates, polystyrenes, polyethylene, polyethylene terephthalate, methylmethacrylate/acrylonitrile copolymers, etc. The hollow resin particles preferably have a shell thickness of 0.1-3 µm, containing a gas such as hydrocarbons, etc. in the shell. The resin particles preferably have 70-95% of moisture on the surface. The resin particles preferably have a true specific gravity of 0.01-0.05.

(2) Ceramic Material

The ceramic material comprises 15-25% by mass of silica, 40-43% by mass of talc, and 15-30% by mass of alumina; per 100% by mass of the ceramic material. The ceramic material is preferably a cordierite-forming material, which is obtained by mixing a silica source powder, an alumina source powder and a magnesia source powder, to form as a main crystal cordierite having a chemical composition mainly comprising 42-56% by mass of $SiO_2$, 30-45% by mass of $Al_2O_3$, and 12-16% by mass of MgO. Pores in the ceramics comprising cordierite as a main crystal are composed of pores formed by sintering silica and talc in the ceramic material, and pores generated by burning the pore-forming material. Accordingly, by adjusting the particle diameters and particle diameter distributions of the ceramic materials such as silica, talc, etc., as well as the above pore-forming material, it is possible to control pores in the cordierite-based ceramics. Among them, silica and the pore-forming material form most pores, largely contributing to the pore structure.

(a) Silica

It is known that silica is more stable at high temperatures than other materials, and melted and diffused at 1300° C. or higher to form pores. Accordingly, desired amounts of pores can be obtained by containing 15-25% by mass of silica. With more than 25% by mass of silica, the amount of kaolin and/or talc, other silica sources, should be reduced to have cordierite as a main crystal, resulting in a reduced kaolin's effect of decreasing thermal expansion, which is obtained by the orientation of kaolin when extruded, and thus resulting in low heat shock resistance. When it is less than 15% by mass, small numbers of pores are open on the cell wall surfaces, unlikely obtaining low pressure loss when captured PM is accumulated. The silica content is preferably 17-23% by mass.

Silica used has a median particle diameter D50 of 15-30 µm, a particle diameter D10 of 10-20 µm at a cumulative volume corresponding to 10% of the total volume, and a particle diameter D90 of 40-60 µm at a cumulative volume corresponding to 90% of the total volume, in a curve of a cumulative volume to a particle diameter; and has a particle distribution, in which the percentage of particles having diameters of 5 µm or less is 1% or less by mass, the percentage of particles having diameters of 10 µm or less is 3% or less by mass, the percentage of particles having diameters of 100 µm or more is 3% or less by mass, the percentage of particles having diameters of 200 µm or more is 1% or less by mass, and a particle diameter distribution deviation SD [=log D80−log D20] is 0.4 or less, wherein D20 represents a particle diameter at a cumulative volume corresponding to 20% of the total volume, and D80 represents a particle diameter at a cumulative volume corresponding to 80% of the total volume, and D20<D80, in a curve of a cumulative volume to a particle diameter. Using silica particles having such particle diameter distribution together with the pore-forming material, the ceramic honeycomb structure of the present invention having a particular pore diameter distribution can be obtained.

When silica has a median particle diameter D50 of less than 15 µm, the percentage of fine pores is high among pores open on the cell wall surfaces, resulting in increased pressure loss when captured PM is accumulated. On the other hand, D50 exceeding 30 µm provides many large pores, resulting in a low capturing ratio of namo-sized PM. The median particle diameter D50 of silica is preferably 17-28 µm, more preferably 19-26 µm.

When silica has D10 of less than 10 µm, the percentage of fine pores deteriorating pressure loss characteristics is undesirably high among pores open on the cell wall surfaces. On the other hand, D10 exceeding 20 undesirably increases the percentage of large pores lowering a capturing ratio of namo-sized PM. The D10 of silica is preferably 12-18 µm, more preferably 13-17 µm.

When silica has D90 of less than 40 µm, the percentage of fine pores deteriorating pressure loss characteristics is undesirably high among pores open on the cell wall surfaces. On the other hand, D90 exceeding 60 µm undesirably increases the percentage of large pores lowering a capturing ratio of nano-sized PM. The D90 of silica is preferably 45-55 µm, more preferably 47-53 µm.

When the percentage of silica particles having diameters of 5 µm or less is more than 1% by mass, or when the percentage of silica particles having diameters of 10 µm or less is more than 3% by mass, the percentage of fine pores is high among pores open on the cell wall surfaces, resulting in increased pressure loss when captured PM is accumulated. The percentage of silica particles having diameters of 5 µm or less is preferably 0.7% or less by mass, more preferably 0.2% or less by mass. The percentage of silica particles having diameters of 10 µm or less is preferably 2% or less by mass. When the percentage of particles having diameters of 100 µm or more is more than 3% by mass, or when the percentage of particles having diameters of 200 µm or more is more than 1% by mass, there are many large pores lowering a capturing ratio of namo-sized PM. The percentage of silica particles having diameters of 100 µm or more is preferably 2% or less by mass, and the percentage of silica particles having diameters of 200 µm or more is preferably 0.7% or less by mass, more preferably 0.2% or less by mass. The particle diameter distribution deviation SD of silica is preferably 0.36 or less, more preferably 0.33 or less.

The sphericity of silica particles is preferably 0.5 or more. When the sphericity of silica particles is less than 0.5, the honeycomb structure undesirably has many pores having sharp corners acting as the starting sites of breakage, likely having low strength. The sphericity of silica particles is preferably 0.6 or more, more preferably 0.7 or more. The sphericity of each silica particle is determined by dividing a projected area of the silica particle by the area of a circle having a diameter corresponding to the longest straight line connecting two points on a periphery of the silica particle through its center of gravity; and can be measured on an electron photomicrograph by an image analyzer.

The silica particles may be crystalline or amorphous, and amorphous silica particles are preferable to adjust the particle diameter distribution. Amorphous silica is produced by pulverizing an ingot obtained by melting a high-purity natural quartz at a high temperature. Silica particles may contain $Na_2O$, $K_2O$, and CaO as impurities, but the total amount of the impurities is preferably 0.1% or less to prevent increase in a thermal expansion coefficient.

Silica particles having high sphericity are obtained by spraying finely pulverized high-purity natural quartz into a high-temperature flame. Sprayed into a high-temperature flame, silica particles are melted to a spherical shape, resulting in amorphous silica having high sphericity. The diameters of spherical silica particles are preferably adjusted by such a method as classification, etc.

(b) Kaolin

As a silica material used for the cordierite-forming material, kaolin powder may be added in addition to silica powder. The kaolin powder is preferably 1-15% by mass. With more than 15% by mass of the kaolin powder, it may be difficult to adjust d98 to 5 μm or less in the pore diameter distribution of the ceramic honeycomb structure. With less than 1% by mass of the kaolin powder, the ceramic honeycomb structure has a large thermal expansion coefficient. The amount of the kaolin powder is more preferably 4-8% by mass.

When kaolin particles are oriented such that their c-axes are perpendicular to the longitudinal direction of the extrusion-molded honeycomb structure, the c-axes of cordierite crystals are parallel to the longitudinal direction of the honeycomb structure, providing the honeycomb structure with a small thermal expansion coefficient. The shape of kaolin particles has large influence on the orientation of kaolin particles. The cleavage index of kaolin particles, which is an index indicating the shape of kaolin particles quantitatively, is preferably 0.80 or more, more preferably 0.85 or more. With a predetermined amount of kaolin particles pressed into a container; the cleavage index of kaolin particles can be determined by the formula of cleavage index=$I_{(002)}/[I_{(200)}+I_{(020)}+I_{(002)}]$, wherein $I_{(200)}$, $I_{(020)}$ and $I_{(002)}$ respectively represent the X-ray diffraction peak intensities of (200), (020) and (002) planes measured on a pressed surface of the kaolin particles, as described in JP 2006-265034 A. The larger the cleavage index, the more the kaolin particles are oriented.

(c) Talc

The ceramic material comprises 40-43% by mass of talc based on 100% by mass thereof in a curve of a cumulative volume (volume of particles accumulated up to a particular diameter) to a particle diameter, the talc has a median particle diameter D50 of 5-15 μm, a particle diameter D10 at a cumulative volume corresponding to 10% of the total volume being 10 μm or less, and a particle diameter D90 at a cumulative volume corresponding to 90% of the total volume being 25 μm or more. Talc, a compound comprising MgO and $SiO_2$ as main components, is reacted with nearby $Al_2O_3$ and melted in the sintering process, thereby forming pores. Accordingly, with talc having a small diameter mixed with an $Al_2O_3$ source, pluralities of pores are dispersively formed in the cell walls, resulting in improved communicability of pores in the cell walls. Talc having a median particle diameter D50 of less than 5 μm provides low communicability of pores, resulting in low pressure loss characteristics when captured PM is accumulated. On the other hand, talc having a median particle diameter D50 of more than 15 μm forms many large pores, resulting in a low capturing ratio of namo-sized PM. The median particle diameter D50 of talc is preferably 6-14 μm, more preferably 8-12 μm.

Talc has D10 of preferably 8 μm or less, more preferably 7 μm or less, and D90 of preferably 25-45 μm, more preferably 25-40 μm.

To reduce the thermal expansion coefficient of a ceramic honeycomb structure having a cordierite-based crystal phase, talc is preferably in a planar particle shape. The morphology index, which is a measure of the flatness of talc particles, is preferably 0.5 or more, more preferably 0.6 or more, most preferably 0.7 or more. The morphology index is, as described in U.S. Pat. No. 5,141,686, determined by the formula of morphology index=Ix/(Ix+2Iy), wherein Ix and Iy respectively represent the diffraction intensities of (004) and (020) planes of talc, which are obtained by the X-ray diffraction measurement of planar talc particles. The larger the morphology index, the higher the flatness of talc particles.

Talc may contain as impurities $Fe_2O_3$, CaO, $Na_2O$, $K_2O$, etc. In the magnesia source, the amount of $Fe_2O_3$ is preferably 0.5-2.5% by mass to obtain the desired particle size distribution, and the total amount of $Na_2O$, $K_2O$ and CaO is preferably 0.5% or less by mass to have a low thermal expansion coefficient.

(d) Alumina

The ceramic material contains 15-30% by mass of alumina based on 100% by mass thereof. Alumina has a median particle diameter D50 of 3-6 μm, a particle diameter D90 at a cumulative volume corresponding to 90% of the total volume being 20 μm or less, and the percentage of particles having diameters of 25 μm or more being 0.4% or less by mass, in a curve of a cumulative volume to a particle diameter. With alumina having such median particle diameter and particle diameter distribution added, pluralities of pores can be dispersed in the cell walls, resulting in improved, communicability of pores in the cell walls, contributing to providing a desired pore diameter distribution to the ceramic honeycomb structure of the present invention. Alumina has a median particle diameter D50 of preferably 3.5-6 μm, more preferably 4-5.5 μm, and D90 of preferably 1-20 μm, more preferably 5-20 μm, the percentage of particles having diameters of 25 μm or more being preferably 0.2% or less by mass. As the alumina source, aluminum hydroxide is preferably used, in addition to alumina. The total amount of $Na_2O$, $K_2O$ and CaO as impurities in alumina and aluminum hydroxide is preferably 0.5% or less by mass, more preferably 0.3% or less by mass, most preferably 0.1% or less by mass.

(3) Production Method

The ceramic honeycomb structure is produced by dry-mixing a ceramic material and a pore-forming material with a binder, and if necessary, additives such as a dispersant, a surfactant, etc.; blending the resultant mixture with water to prepare a plasticized moldable material, which is extruded from a known die to form a honeycomb-shaped green body, by a known extrusion-molding method, such as a plunger method, a screw method, etc.; drying the green body; machining end and peripheral surfaces, etc. of the green body, if necessary; and then sintering the green body.

Sintering is conducted while controlling heating and cooling speeds in a continuous or batch furnace. When the ceramic material is a cordierite-forming material, it is kept at 1350-1450° C. for 1-50 hours to sufficiently form cordierite as a main crystal, and then cooled to room temperature. Particularly when a large ceramic honeycomb structure having an outer diameter of 150 mm or more and a length of 150 mm or more is produced, the temperature-elevating speed is preferably 0.2-10° C./hr in a binder-decomposing temperature range, for example, between 150° C. and 350° C., and 5-20° C./hr in a cordierite-forming temperature range, for example, between 1150° C. and 1400° C., thereby preventing cracking in the green body in the sintering process. The cooling is preferably conducted at a speed of 20-40° C./h in a temperature range of 1400° C. to 1300° C.

The resultant honeycomb structure can be plugged in desired flow path end portions by a known method to form a ceramic honeycomb filter. The plugs may be formed before sintering.

The present invention will be explained in more detail by Examples below without intention of restriction.

Examples 1-3 and Comparative Example 1

Silica powder, talc powder, alumina powder, aluminum hydroxide powder and kaolin powder having the particle shapes (particle diameters, particle diameter distributions, etc.) shown in Tables 1-5 were mixed in the proportions shown in Table 7, the total amount of ceramic materials being 100 parts by mass, thereby obtaining cordierite-forming material powders having such chemical compositions as to form cordierite after sintering.

Each cordierite-forming material powder was mixed with a pore-forming material having the particle shape and true specific gravity shown in Table 6 in the proportion shown in Table 7, and then blended with methylcellulose and water to prepare a plasticized moldable ceramic material. The sphericity of each pore-forming material particle was determined by calculating the formula of A1/A2, wherein A1 represents the projected area of each pore-forming material particle (determined from its electron microscopic image by an image analyzer), and A2 represents the area of a circle having a diameter corresponding to the longest straight line connecting two points on a periphery of the pore-forming material particle through its center of gravity, and averaging the values of A1/A2 calculated on 20 particles.

TABLE 1

| Silica | D50[1] (μm) | D10 (μm) | D90 (μm) | Percentage (%) | | | |
|---|---|---|---|---|---|---|---|
| | | | | ≤5 μm | ≤10 μm | ≥100 μm | ≥200 μm |
| A | 25.7 | 15.3 | 49.2 | 1.0 | 1.7 | 1.0 | 0.0 |
| B | 10 | 4.1 | 22.4 | 16 | 50 | 4.0 | 2.0 |
| C | 21.1 | 11.1 | 45.4 | 1.0 | 1.7 | 1.0 | 0.0 |

Note:
[1]D50 is a median particle diameter.

| Silica | D20 (μm) | D80 (μm) | SD[1] | Sphericity | % by mass | | |
|---|---|---|---|---|---|---|---|
| | | | | | CaO | Na$_2$O | K$_2$O |
| A | 18.2 | 38.7 | 0.33 | 0.81 | 0.001 | 0.0022 | 0.0024 |
| B | 5.5 | 19.0 | 0.54 | 0.71 | 0.001 | 0.0022 | 0.0024 |
| C | 14.2 | 34.3 | 0.33 | 0.82 | 0.001 | 0.0022 | 0.0024 |

Note:
[1] Particle size distribution deviation SD = log D80-log D20.

TABLE 2

| Talc | D50[1] (μm) | D10 (μm) | D90 (μm) | Morph-ology Index | % by mass | | | |
|---|---|---|---|---|---|---|---|---|
| | | | | | CaO | Na$_2$O | K$_2$O | Fe$_2$O$_3$ |
| A | 11.8 | 5.4 | 35.3 | 0.59 | 0.14 | 0.001 | 0.001 | 1.1 |
| B | 14.0 | 7.5 | 44.0 | 0.58 | 0.14 | 0.001 | 0.001 | 1.1 |
| C | 10.9 | 3.5 | 31.2 | 0.59 | 0.14 | 0.001 | 0.001 | 1.1 |

Note:
[1]D50 is a median particle diameter.

TABLE 3

| Alumina | D50[1] (μm) | D90 (μm) | ≥25 μm (%)[2] | % by mass | | |
|---|---|---|---|---|---|---|
| | | | | CaO | Na$_2$O | K$_2$O |
| A | 4.9 | 9.7 | 0.01 | 0.001 | 0.25 | 0.001 |
| B | 7.8 | 19.0 | 2.3 | 0.001 | 0.15 | 0.001 |
| C | 5.0 | 9.9 | 0.01 | 0.001 | 0.25 | 0.001 |
| D | 4.4 | 8.5 | 0.01 | 0.001 | 0.25 | 0.001 |

Note:
[1]D50 is a median particle diameter.

(2) The percentage of particles of 25 μm or more.

TABLE 4

| Aluminum Hydroxide | D50[1] (μm) | % by mass | | |
|---|---|---|---|---|
| | | CaO | Na$_2$O | K$_2$O |
| A | 8.9 | 0.001 | 0.04 | 0.001 |
| B | 12.0 | 0.001 | 0.04 | 0.001 |
| C | 9.6 | 0.001 | 0.035 | 0.001 |

Note:
[1]D50 is a median particle diameter.

TABLE 5

| Kaolin | D50[1] (μm) | Cleavage Index | % by mass | | |
|---|---|---|---|---|---|
| | | | CaO | Na$_2$O | K$_2$O |
| A | 4.2 | 0.92 | 0.11 | 0.02 | 0.06 |
| B | 5.5 | 0.91 | 0.11 | 0.02 | 0.06 |

Note:
[1]D50 is a median particle diameter.

TABLE 6

| Pore-Forming Material | Type | D50[1] (μm) | D5 (μm) | D10 (μm) | D90 (μm) | D95 (μm) |
|---|---|---|---|---|---|---|
| A | Hollow Resin | 40.1 | 19.0 | 23.5 | 62.8 | 72.5 |
| B | Hollow Resin | 38.0 | 13.6 | 17.0 | 61.0 | 66.2 |
| C | Hollow Resin | 45.6 | 21.5 | 26.8 | 70.4 | 82.3 |
| D | Hollow Resin | 37.7 | 19.2 | 23.1 | 58.3 | 67.2 |

| Pore-Forming Material | D50/(D90-D10) | Sphericity | True Specific Gravity |
|---|---|---|---|
| A | 1.02 | 0.92 | 0.02 |
| B | 0.86 | 0.92 | 0.02 |
| C | 1.05 | 0.92 | 0.02 |
| D | 1.07 | 0.92 | 0.02 |

Note:
[1]D50 is a median particle diameter.

The particle diameters and particle diameter distributions of silica powder, talc powder, alumina powder, aluminum hydroxide powder, kaolin powder and the pore-forming material powder were measured by a particle diameter distribution meter (Microtrack MT3000 available from Nikkiso Co., Ltd.), and the median particle diameters D50, the percentages of particles having diameters of 10 μm or less, the percentages of particles having diameters of 25 μm or more, the percentages of particles having diameters of 100 μm or more, D90, D80, D20, D10, etc. were determined from their particle diameter distributions, and the particle diameter distribution deviations SD were determined from D80 and D20.

TABLE 7

| No. | Silica | | Talc | | Alumina | | Aluminum Hydroxide | | Kaolin | | Pore-Forming Material | |
|---|---|---|---|---|---|---|---|---|---|---|---|---|
| | Type | Amount[1] | Type | Amount[1] | Type | Amount[1] | Type | Amount[1] | Type | Amount[1] | Type | Amount[1] |
| Example 1 | A | 18.1 | A | 41.2 | A | 23.3 | A | 11.3 | A | 6.0 | A | 5.5 |
| Example 2 | A | 18.1 | A | 41.2 | C | 23.3 | C | 11.3 | A | 6.0 | C | 6.5 |
| Example 3 | C | 18.1 | C | 41.2 | D | 23.3 | A | 11.3 | A | 6.0 | D | 5.0 |
| Com. Ex. 1 | B | 17.5 | B | 41.0 | B | 22.8 | B | 11.1 | B | 7.6 | B | 7.5 |

Note:
[1]The amount is expressed by parts by mass.

Each of the resultant moldable materials was extruded to form a honeycomb-shaped green body, which was dried and machined to remove a peripheral portion. The green body was then sintered according to a schedule of 210 hours, which comprised heating at an average speed of 10° C./hr between room temperature and 150° C., 2° C./hr between 150° C. and 350° C., 20° C./hr between 350° C. and 1150° C., and 15° C./hr between 1150° C. and 1410° C.; keeping the highest temperature of 1410° C. for 25 hours; and cooling at an average speed of 30° C./hr between 1400° C. and 1300° C., and 80° C./hr between 1300° C. and 100° C., in a furnace. The sintered ceramic honeycomb body was coated with a peripheral layer material comprising amorphous silica and colloidal silica on the peripheral surface, and then dried to obtain each ceramic honeycomb structure of Examples 1-3 and Comparative Example 1 having an outer diameter of 266.7 mm, length of 304.8 mm, a cell wall thickness of 12 mil (0.30 mm), and a cell density of 260 cpsi (40.3 cells/cm$^2$).

After flow path ends of each ceramic honeycomb structure were alternately plugged by filling a plugging material slurry of a cordierite-forming material, the plugging material slurry was dried and sintered, to produce each cordierite-type ceramic honeycomb filter of Examples and Comparative Example. The sintered plugs were as long as 7-10 mm. In each Example and Comparative Example, the same two ceramic honeycomb filters were produced.

One of the resultant ceramic honeycomb filters in each of Examples 1-3 and Comparative Example 1 was measured with respect to a pore diameter distribution by mercury porosimetry and a thermal expansion 1. coefficient, by the following methods. The mercury porosimetry measurement was conducted by setting a test piece (10 mm×10 mm×10 mm) cut out of each ceramic honeycomb filter in a measurement cell of Autopore III available from Micromeritics, evacuating the cell, and then introducing mercury into the cell under pressure to determine the relation between the pressure and the volume of mercury forced into pores in the test piece. The pressure was converted to a pore diameter, and cumulation was conducted from larger pore diameters to smaller pore diameters to determine a cumulative pore volume (corresponding to the volume of mercury), which was plotted against a pore diameter to obtain a graph showing the relation between a pore diameter and a cumulative pore volume as shown in FIG. 3.

The mercury-introducing pressure was 0.5 psi (0.35×10$^{-3}$ kg/mm$^2$), and constants used for calculating the pore diameter from the pressure were a contact angle of 130°, and a surface tension of 484 dyne/cm. A cumulative pore volume at mercury pressure of 1800 psi (1.26 kg/mm$^2$, corresponding to a pore diameter of about 0.1 μm) was regarded as the total pore volume.

Figure 4:
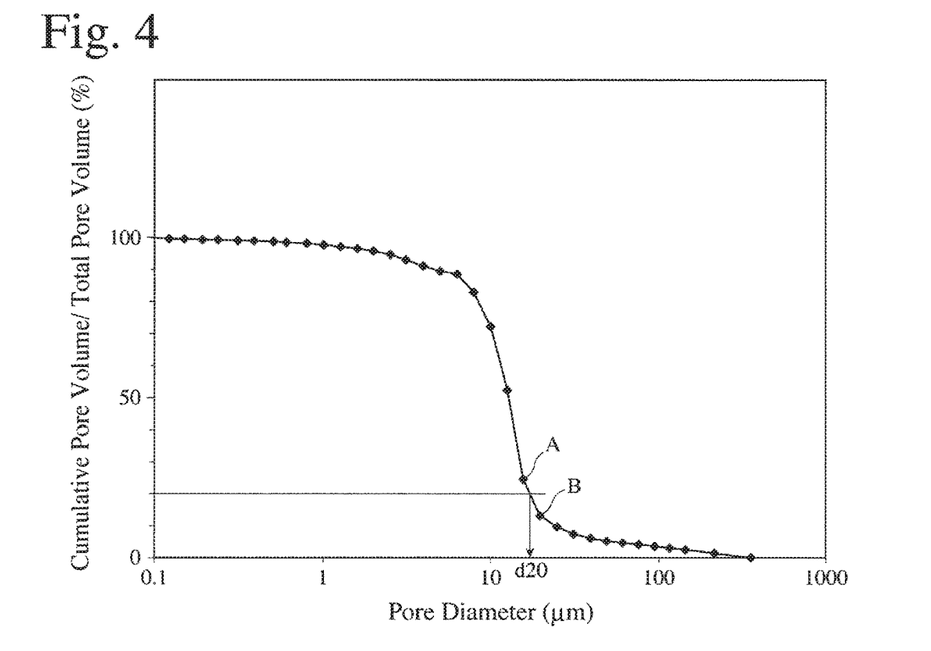
FIG. 4 is a graph for explaining a method for determining d20 from the relation of a cumulative pore volume to a pore diameter measured by mercury porosimetry.

Calculated from the mercury porosimetry measurement results were a total pore volume, porosity, a pore diameter d2 at a cumulative pore volume corresponding to 2% of total pore volume, a pore diameter d5 at 5%, a pore diameter d10 at 10%, a pore diameter d20 at 20%, a pore diameter (median pore diameter) d50 at 50%, a pore diameter d80 at 80%, a pore diameter d85 at 85%, a pore diameter d90 at 90%, a pore diameter d98 at 98%, the volume of pores of more than 100 μm, (d10−d90)/d50, (d50−d90)/d50, and (d10−d50)/d50. Further calculated was σ[=log d20−log d80], which was the difference between a logarithm of the pore diameter d20 at a cumulative pore volume corresponding to 20% of the total pore volume and a logarithm of the pore diameter d80 at 80%. The values of the pore diameters d2, d5, d10, d50, d85, d90 and d98 were determined by the interpolation of the nearest two measured points on both sides of each pore diameter among those measured by mercury porosimetry. Take d20 for example, as shown in FIG. 4, the nearest two measured points A and B on both sides of a cumulative pore volume corresponding to 20% of the total pore volume among those measured by mercury porosimetry were selected, a straight line connecting the points A and B was drawn, and a point on the straight line, which corresponded to 20% of the total pore volume, was regarded as d20. The porosity was calculated from the measured total pore volume, using 2.52 g/cm$^3$ as the true density of cordierite. These results are shown in Table 8.

TABLE 8

| No. | Total Pore Volume (cm$^3$/g) | Porosity (%) | Thermal Expansion Coefficient (×10$^{-7}$/° C.) |
|---|---|---|---|
| Example 1 | 0.535 | 57.4 | 8.0 |
| Example 2 | 0.595 | 60.0 | 7.4 |
| Example 3 | 0.449 | 53.1 | 7.2 |
| Com. Ex. 1 | 0.615 | 60.8 | 9.0 |

| No. | d2 (μm) | d5 (μm) | d10 (μm) | d50 (μm) | d85 (μm) | d90 (μm) | d98 (μm) |
|---|---|---|---|---|---|---|---|
| Example 1 | 175 | 53.6 | 24.3 | 12.8 | 7.4 | 4.7 | 1.0 |
| Example 2 | 172 | 54.3 | 25.6 | 13.0 | 7.0 | 4.9 | 1.2 |
| Example 3 | 157 | 41.9 | 20.7 | 10.8 | 5.1 | 3.7 | 0.8 |
| Com. Ex. 1 | 120 | 92.0 | 25.0 | 15.5 | 12.0 | 9.5 | 6.3 |

| No. | (d10−d90)/d50 | (d50−d90)/d50 | (d10−d50)/d50 |
|---|---|---|---|
| Example 1 | 1.53 | 0.63 | 0.90 |
| Example 2 | 1.59 | 0.62 | 0.97 |
| Example 3 | 1.58 | 0.66 | 0.91 |
| Com. Ex. 1 | 1.00 | 0.39 | 0.61 |

| No. | d20 (μm) | d80 (μm) | σ[1] | Pore Volume (cm$^3$/g) >100 μm[2] | ≥20 μm[3] |
|---|---|---|---|---|---|
| Example 1 | 17.4 | 8.5 | 0.31 | 0.018 | 0.07 |
| Example 2 | 17.8 | 8.5 | 0.32 | 0.020 | 0.09 |

TABLE 8-continued

| | | | | | |
|---|---|---|---|---|---|
| Example 3 | 15.0 | 6.6 | 0.36 | 0.013 | 0.05 |
| Com. Ex. 1 | 23.0 | 12.5 | 0.26 | 0.023 | 0.20 |

Note:
[1] σ = log d20-log d80.
[2] Pores of more than 100 μm.
[3] Pores of 120 μm or more.

With respect to another ceramic honeycomb filter produced in each of Examples 1-3 and Comparative Example 1, initial pressure loss, pressure loss after capturing PM (pressure loss when 2 g/liter of soot was captured), and a number-based capturing ratio of PM at an early stage of capturing were measured by the following methods. The results are shown in Table 9.

(a) Initial Pressure Loss

The initial pressure loss was measured on a ceramic honeycomb filter fixed to a pressure loss test stand, to which air was supplied at a flow rate of 10 Nm³/min, and expressed by pressure difference between the inlet side and the outlet side (pressure loss). The initial pressure loss was evaluated by the following standard:

Poor The pressure loss was more than 1.0 kPa,
Fair The pressure loss was more than 0.8 kPa and 1.0 kPa or less,
Good The pressure loss was more than 0.6 kPa and 0.8 kPa or less, and
Excellent The pressure loss was 0.6 kPa or less.

(b) Pressure Loss After Capturing PM

The pressure loss after capturing PM was measured on a ceramic honeycomb filter fixed to a pressure loss test stand, to which combustion soot having an average particle diameter of 0.1.1 μm was supplied at a speed of 1.3 g/h together with air at a flow rate 10 Nm³/min, and expressed by pressure difference (pressure loss) between the inlet side and the outlet side when 2 g of soot was accumulated per 1 liter of a filter volume. The pressure loss after capturing soot was evaluated by the following standards:

Poor The pressure loss was more than 1.5 kPa,
The pressure loss was more than 1.3 kPa and 1.5 kPa or less,
Good The pressure loss was more than 1.0 kPa and 1.3 kPa or less, and
Excellent The pressure loss was 1.0 kPa or less.

(c) Number-Based Capturing Ratio of PM at an Early Stage of Capturing

The number-based capturing ratio of PM at an early stage of capturing was measured on a ceramic honeycomb filter fixed to a pressure loss test stand, to which combustion soot having an average particle diameter of 0.11 μm was supplied at a speed of 1.3 g/h together with air at a flow rate 10 Nm³/min, to measure the number of combustion soot particles flowing into and from the honeycomb filter per 1 minute by a scanning mobility particle sizer (SMPS) (Model 3936 available from IN, and calculated by the formula of $(N_{in}-N_{out})N_{in}$, wherein $N_{in}$ represents the number of combustion soot particles flowing into the honeycomb filter, and $N_{out}$ represents the number of combustion soot particles flowing from the honeycomb filter, in 1 minute between 40 minutes and 41 minutes after the start. The number-based capturing ratio of PM at an early stage of capturing was evaluated by the following standard:

Excellent The PM-capturing ratio was 98% or more,
Good The PM-capturing ratio was 96% or more and less than 98%,
Fair The PM-capturing ratio was 95% or more and less than 96%, and
Poor The PM-capturing ratio was less than 95%.

TABLE 9

| No. | Initial Pressure Loss | PM-Captured Pressure Loss[1] | PM-Capturing Ratio[2] |
|---|---|---|---|
| Example 1 | Excellent | Excellent | Excellent |
| Example 2 | Excellent | Excellent | Good |
| Example 3 | Good | Good | Excellent |
| Com. Ex. 1 | Fair | Poor | Poor |

Note:
[1] Pressure loss when 2 g/liter of soot was captured.
[2] A number-based capturing ratio of PM at an early stage of capturing.

It is clear from Table 9 that the ceramic honeycomb filters of Examples 1-3 (the present invention) exhibited improved number-based capturing ratios of PM at an early stage of capturing, while keeping low pressure loss.

The ceramic honeycomb filter of Comparative Example 1 had a large pore diameter d5 at a cumulative pore volume corresponding to 5% of the total pore volume, because alumina used had a large median particle diameter with a high percentage of particles having diameters of 25 μm or more, thereby exhibiting a poor PM-capturing ratio.

What is claimed is:

1. A ceramic honeycomb structure having pluralities of flow paths partitioned by porous cell walls,
   (a) said cell walls having porosity of 50-60%; and
   (b) in a pore diameter distribution in said cell walls measured by mercury porosimetry,
   (i) a pore diameter d5 at a cumulative pore volume corresponding to 5% of the total pore volume being 22 μm or more and less than 55 μm,
   a pore diameter d10 at 10% being 15-35 μm,
   a pore diameter (median pore diameter) d50 at 50% being 10-20 μm,
   a pore diameter d85 at 85% being 5-9 μm,
   a pore diameter d90 at 90% being 3-8 μm,
   a pore diameter d98 at 98% being 2.5 μm or less,
   (d10–d90)/d50 being 1.3-1.8,
   (d50–d90)/d50 being 0.45-0.75, and
   (d10–d50)/d50 being 0.75-1.1; and
   (ii) σ[=log d20–log d80] being 0.39 or less, wherein σ represents the difference between a logarithm of the pore diameter d20 at a cumulative pore volume corresponding to 20% of the total pore volume and a logarithm of the pore diameter d80 at 80%.

2. The ceramic honeycomb structure according to claim 1, wherein a pore diameter d2 at a cumulative pore volume corresponding to 2% of the total pore volume is 75-250 μm, and the volume of pores of 20 μm or more is 0.12 cm³/g or less.

3. The ceramic honeycomb structure according to claim 1, wherein said porosity is 52-60%.

4. The ceramic honeycomb structure according to claim 1, wherein said median pore diameter d50 is 10-18 μm.

5. The ceramic honeycomb structure according to claim 1, wherein said σ is 0.3 or less.

* * * * *